Feb. 9, 1954
R. B. LILLARD ET AL
2,668,644
NEEDLE THREADER
Filed Jan. 4, 1950
2 Sheets-Sheet 1
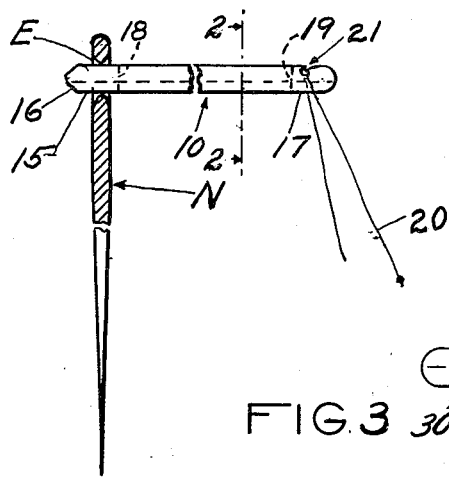
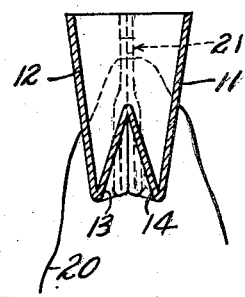
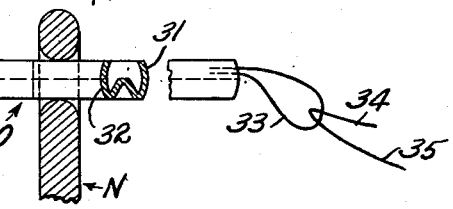
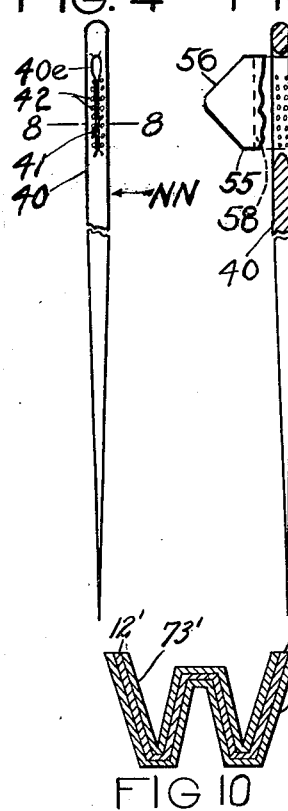
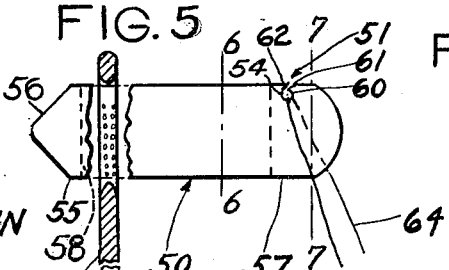
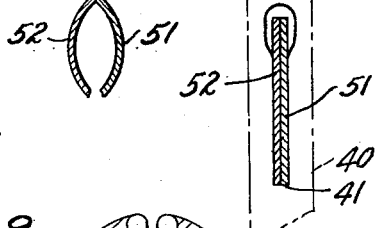
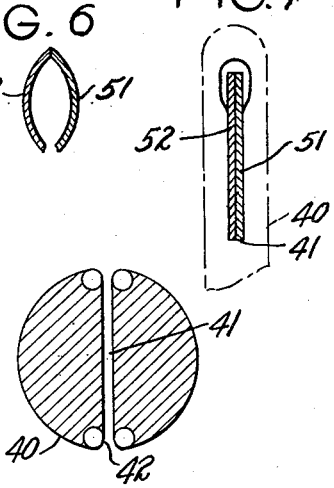
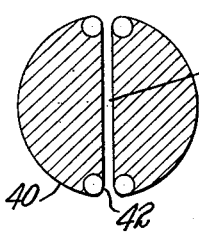
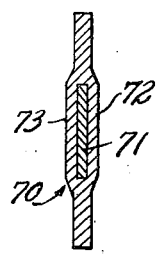
INVENTORS
R. B. Lillard
and W. W. Lillard
by *Wm. W. Lillard*
Attorney Feb. 9, 1954
R. B. LILLARD ET AL
2,668,644
NEEDLE THREADER
Filed Jan. 4, 1950
2 Sheets-Sheet 2
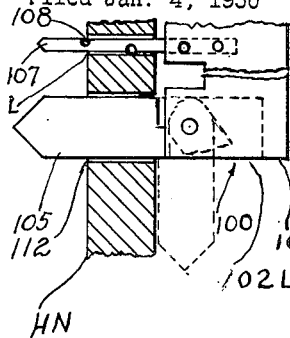
FIG.11
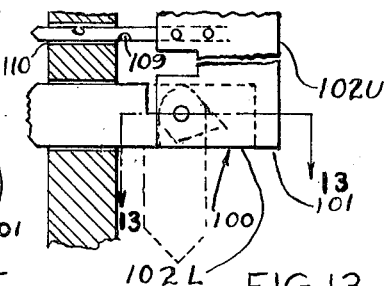
FIG.12
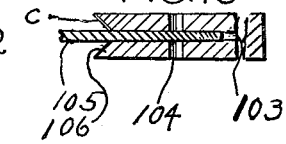
FIG.13
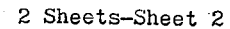
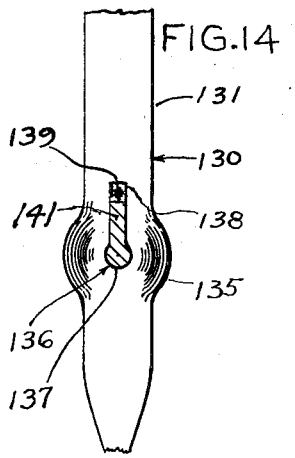
FIG.14
FIG.15
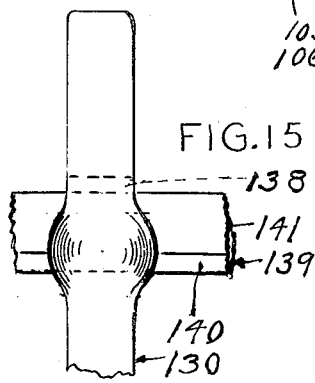
FIG.16
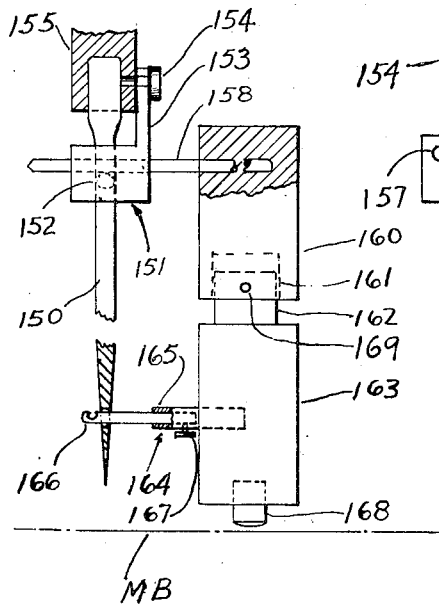
FIG.17
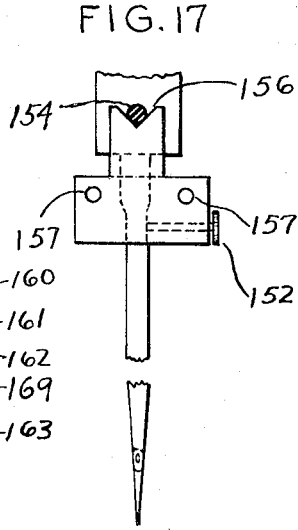
FIG.18
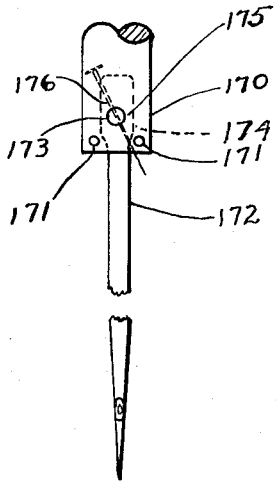
INVENTORS
R. B. LILLARD
and W. W. LILLARD
By  Wm. W. Lillard
ATTORNEY Patented Feb. 9, 1954

2,668,644

UNITED STATES PATENT OFFICE 2,668,644
NEEDLE THREADER

Rufus Bibb Lillard, El Paso, Tex., and William W. Lillard, Beaumont, Calif.; said Rufus Bibb Lillard assignor to said William W. Lillard Application January 4, 1950, Serial No. 138,076

4 Claims. (Cl. 223—99)

The present invention relates generally to sewing needles and more particularly to needle threading devices.

As far as applicants are aware, needle threaders heretofore proposed which employed guiding means for helping to insert a quite small and relatively delicate notched thread-pulling member through eyes of needles had these objections. The guiding means, usually metallic, engaged against one or more side surfaces of a needle and thus tended to mar the important smooth finish of the surface. Also, such guiding means required some skill and considerable care to use satisfactorily.

One object of the present invention is to provide improved guiding means in needle threading devices.

Another object is to provide guiding means forming an element of a needle threading device which safeguards the outer smooth surfaces of a sewing needle against being marred and roughened.

Another object is to provide a needle threader that can be manufactured and sold at prices which will permit it to be offered as a trade premium to purchasers of a package of needles at no extra cost.

Another object of the present invention is the provision of a sewing needle having an aperture guide element effective for cooperation with other guide elements of a needle threader.

Other objects and advantageous feature of our invention will appear as the description proceeds.

With reference to the drawings which form a part of the specification:

Figure 1 is an enlarged side view, broken away in part, of a needle of well known form and a needle threader which embodies certain features of our invention having its leading end projected through the eye of the needle. Figure 2 may be considered an enlarged cross-sectional view along the line 2—2 of Figure 1 in the direction of the arrows. Figure 3 is a view similar to Figure 1 and shows a modified form of the threader of Figure 1. Figure 4 is an enlarged side view, broken away in part, of an improved needle embodying one feature of our invention. Figure 5 is an enlarged side view, broken away in part, of the needle structure shown in Figure 4 with a needle threader especially designed for use with such a threader extending partly through the eye of the needle and a guide aperture adjacent the eye. Figure 6 may be considered a cross-section along the line 6—6 of Figure 5. Figure 7 is a cross-section along the line 7—7 of Figure 5, a phantom partial view of the needle structure being also shown. Figure 8 is a greatly enlarged cross-section along the line 8—8 of Figure 4. Figure 9 is a cross-sectional view illustrating an alternative construction of the body of a threader similar to that of Figures 5 and 6. Figure 10 is a much enlarged cross-section through a needle threader embodying our invention made similarly to the threader of Figure 2 of very thin flexible steel and having a very thin coating of a material softer than steel. Figure 11 is an enlarged view from one side broken away in part, of a hand sewing needle having a guide aperture which embodies a feature of our invention and a needle threader in cooperative relation to the needle aperture. Figure 12 is a view similar to that of Figure 11 and shows the threader in another relation to the needle. Figure 13 is an enlarged cross-section through the structure of Figure 12 along the line 13—13. Figure 14 is a partial enlarged view as from the right side of a sewing machine needle in place in a sewing machine which needle embodies a feature of our invention. Figure 15 is an enlarged view as from the front of the sewing machine mentioned in the description of Figure 14 of the needle shown in Figure 14 and shows a guide member in cooperative relation to the needle, both the needle and guide member being broken away in part. Figure 16 is an enlarged side view as from the right hand side of a sewing machine of an element of a needle threader device which embodies certain features of our invention. Figure 17 is a partial enlarged view of the structure of Figure 16 as from the right of the sewing machine and shows other elements of the threader device in cooperative relation to the element illustrated in Figure 16. Figure 18 is an enlarged side view, broken away in part, of a sewing machine needle and a needle gripping member of a sewing machine which member embodies a feature of our invention.

It is to be understood that the structures shown in the several views of the drawings are operative devices but are for illustrative purposes mainly.

The present application is a substitute for and a continuation-in-part of our joint application Serial Number 581,634, filed March 5, 1945.

According to one embodiment of our invention as illustrated in Figures 1 and 2, a needle N having an eye E of usual shape and dimensions, except as hereinafter appears, is shown. The end of an eye of a hand sewing needle nearest the rear end of the needle is the end which ordinarily engages the work piece, i. e. length of sewing thread and therefore deserves and usually gets more attention as to its smooth finish when manufactured. For reasons and advantages presently to appear, the eye E of the needle N is preferably materially longer than the eye in a "sharp" needle of the same length. The length of such an eye, E, is ordinarily several times its width but the length of an eye in a small, so-called "sharp" needle for hand sewing is only a small fraction of an inch usually. A threader generally designated as 10 is made of four elements 11, 12, 13, and 14 formed by lengthwise folding of a strip of material to have a cross-section resembling a W.

This strip of material will preferably be very flexible and somewhat resilient and softer than the metal, usually hard steel, from which needles are commonly made. This strip of material may be a suitable cellulose plastic, such for example, as that known to the trade as Celluloid. It may also be made of thin hard rubber or other flexible plastics, and can be made of metals, such as brass or aluminum, which are considerably softer than steel. And as is pointed out hereinafter, the strip can be made of thin, flexible, resilient steel having a softer protective coating, preferably in a bright color.

As illustrated in Figure 2, the strip material of the threader may be folded to have two wide outside fold elements 11 and 12 and two narrower inside fold elements 13 and 14 for a purpose presently to appear. The width of the outside elements 11 and 12 is slightly less than the length of the smallest eye of a needle through which the threader is to be passed. The aggregate thickness of the four strip elements 11, 12, 13 and 14 is slightly less than the width of the smallest needle eye through which the threader is to be passed, the strip elements being pressed closely together when passing through a needle. The resiliency of the material cause the strip elements to spread out into their W form again after having been passed through a needle.

The W-like form of cross-section of the threader 10 gives it additional resistance to transverse bending which is desirable in view of the exceptional thinness of the strip elements in some cases. The end portions of the four strip elements are cemented together to form a single end portion 15 with a pointed end 16 at the leading end of the threader and an end portion 17 at the rear or trailing end of the threader. The lengths of the forward and rear end portions are indicated by the dotted lines 18 and 19, respectively. These lengths may vary considerably however. The length of the forward cemented portion preferably is enough to permit this portion to be grasped between a person's thumb and first finger and leave at least the pointed end 16 projecting to be inserted through the eye of the needle.

For pulling a length of sewing thread 20 through the eye E, a notch 21 is provided in the rear end portion 17 and may have a form as is described more particularly hereinafter in connection with the structure of Figure 5. If desired, the thread may have a knot made in it before the threading operation begins or it can be knotted in a usual way after the threading operation is completed.

As the thread 20, looped in the notch 21, passes through the eye E, twice the thickness of the thread is added to the thickness of the threader which must pass at the same time through the eye E. By placing the notch 21 at the top edge of the threader and by positioning the juncture of the folded strip elements 13 and 14 below the bottom of the notch 21, it can be seen that only two thicknesses of the very thin strip elements, 11 and 12, and only two thicknesses of the thread 20 have to be accommodated, i. e. passed through the eye E in using our threader. In some cases, it may be advantageous to have the rear end portions of strip elements 13 and 14 under the notch 21 cut away at the line 19. After the threader 10 has been pulled entirely through the needle N by a movement of the user's arm away from the needle, a small additional movement of the same arm in the same direction will pull the threader clear of the sewing thread in most cases. Especially, if the thread has already been knotted and is of usual or moderate length.

It will be noted that the sewing thread 20 is pulled through the eye E in contact with the interior surface of the eye that is usually the smoothest finished portion of the interior surface. This reduces the danger of fraying small thread fibers. This result is obtained by guiding the notch in close proximity to the rear end of the eye E.

In Figure 3 is illustrated another form our invention may take. A threader body 30 may be of the same construction as the threader 10 except that the outside strip elements 31 and 32 may have arcuate forms as to their cross-sections approximately as is indicated in Figure 3. This arcuate form tends to increase the resistance of the body 30 to sidewise bending, but will flatten out readily when passing through the eye of a needle if such is necessary. In some cases as when the threader body 30 is to be used with an extra small needle the two ends of a short loop 33 of thread extra small in diameter and made of some unusually strong material such as natural or artificial silk-like fibers such as is known to the trade as nylon may be cemented strongly to the inside faces of the outside strip elements 31 and 32 near their trailing ends. In use, with the needle having its pointed end up, one end portion of a length of sewing thread 34 is put through the loop 33 and the threader body 30 is passed through the needle's eye and pulled until the loop 33 and thread 34 pass through and are disengaged one from the other when a knot 35 engages against the needle. It will be noted that the work piece, the thread 34, is made to engage against the smoothest portion of the eye surface while it is being pulled through the eye.

In Figure 4 is shown a needle for hand sewing that is especially well suited for use with threaders according to our invention. This needle may have a body 40 of the same outward form or appearance of a needle of the same size of usual construction except as to the eye and adjacent areas. In the body 40, the eye includes an eye element 40e which may be substantially the same in construction and form of eyes of usual construction in similar needles. There is also an eye element 41 which may be a narrow slot extension of the eye element 40e. At each side of the needle 40, i. e. at each end of the slot element 41 is provided a small flared mouth for the slot. In each of these mouths, there are provided numerous, small, shallow, dulled-edge recesses or indentations 42. The length of the slot eye element 41 is preferably such as will provide an indented finger-gripping portion of the body for engagement by the user's thumb and first finger. The preferred width of the slot eye element 41 will presently appear.

A needle threader 50 showing another form our invention may take is well suited for use with improved needle of Figures 4 and 8. The threader 50 may be made of thin, flexible, resilient material like that described above in connection with the threader 10. It may have a strip element 51 and a strip element 52 integrally joined along a lengthwise edge at the upper side of the threader. These strip elements 51 and 52 may each have an arcuate cross-section, as indicated in Figure 6, which will enable the material of the strip elements to be quite thin and yet have a sufficient resistance to transverse bending. The threader 50 has a thread-receiving notch 54 which may be approximately the size and shape of the notch 21. Therefore, the following description of the notch 54 may be applied to the notch 21, although it is to be understood that either of these notches may be made in a number of different forms without departing from the present invention. It is desirable, however, that the notches 21 and 54 each have a thread-receiving hole 60 larger than the thread and a flaring inlet or mouth element 61 for the hole that slopes downwardly toward the leading end of the threader. By this construction, the thread is unlikely to slip out of the notched hole 60 as the threader is moved forwardly in passing through a needle. And a nose-like element 62 which is formed by making the mouth will slope toward the trailing end of the threader and thus be unable to hang or catch on the needle at the sides of the eye as the threader is passed through the latter since the nose will be flexible.

A leading end portion 55 of the strips 51 and 52 may be formed with a point 56 and be cemented together to facilitate passing the point through an eye of a needle. Trailing end portions 57 of the strips 51 and 52 may be cemented together a short distance in advance of the notch 54. The length of the end portion 55 may be as indicated by the dotted line 58 or as long as described above for the end portion 15.

The strips 51 and 52 formed with arcuate cross-sections will flatten out readily as they pass through the eye elements 40e and 41 and will resume their arcuate forms afterwards because of the resilience of the material from which they are made. It is to be understood that strips 51 and 52 are preferably made from a single wider strip which is folded lengthwise and thereafter has the point 56 and notch 54 made by a single stamping operation on a stamping press. Or the stamping operation may be performed first. The thickness of the strip stock from which the threader 50 is made will, in most cases, be only a few thousandths of an inch. The width of the slot element 41 will be only a little more than twice the thickness of the strip stock.

The cementing at each end of the threaders 10 and 50 is at one operation at a very small expense. Thus it can be seen by those skilled in manufacturing practices that we are able to provide an improved needle threader for a low manufacturing cost which is one object of our invention.

A length of sewing thread can be operatively placed in either notch 21 or 54 by simply looping it around the threader concerned and moving the thread loop along the threader with a light pull downwardly until the loop falls into the notch. After passing the threader 10 or 50 through the needle, the needle threader concerned may be disengaged from the thread without returning the threader through the needle.

In Figure 9 is illustrated a construction of a strip suitable for making a needle threader according to our invention. A body 70 may have an inner stiffening means in the form of a thin strip of steel 71 inclosed by two strips of suitable thin, soft plastic material 72 and 73. In actual use the body 70 may have approximately the same thickness throughout its width and length. A threader may be constructed from the body 70 in accordance with the disclosures hereinbefore.

With regard to the structures shown in Figures 11 and 12, a needle threader generally designated as 100 may have its body portion 101 made of hard magnetized steel in a usual U-shaped form. A lower arm 102L (as viewed in Figure 11) may be made with a narrow lengthwise slot 103 in which may be mounted on a pin 104 a guide member 105. This guide fits tightly in the slot 103 so that friction will hold the guide positively extended in work position (see Figure 11) or at right angles thereto, as is indicated by dotted lines in Figure 12. The end of arm 102C preferably has a shallow V-shaped groove formation 106 for a purpose presently to appear. To an upper arm 102U of the body 101 may be detachably fastened a small thread-pulling member 107 provided with an upper notch 108 (as viewed in Figure 11) and a lower notch 109. A loop of thread L may be placed in the upper notch 108 to be pulled through an eye 110 of a hand sewing needle HN in a well known way.

A hand sewing needle adapted for use with the threader of Figures 11 and 12 may have a long thread-receiving eye such as is found in the widely used "Crewel" needles, or be made with a shorter thread-receiving eye such as the eye 110 and a threader guide slot 112 positioned a predetermined distance along the needle from the eye 110. The slot will preferably be made considerably narrower than the width of the eye approximately as indicated in Figure 4. A portion of metal stock between the eye 110 and slot 112 is advantageous since it enables a needle to safely withstand more severe strains from a thimble on a person's finger than a Crewel needle can withstand.

The guide member 105 extends outwardly a short distance farther than the thread puller 107 and the latter necessarily enters the eye 110 when the guide has been inserted a short distance in the guide slot 112. Attention is directed to the marked advantage of the magnetized body 101 and the groove 106 which hold a needle steady against the body while a loop of thread L is being placed in the notch 108 with one hand. The other hand can grasp the body more securely and easily than it could a much smaller needle. The surfaces of the end of the lower arm 102L in the groove 106 may have a thin soft coating C of a material such as lead or copper applied in a way that does not affect detrimentally to a material extent the magnetism of the body. Such a coating safeguards the important smooth finish of a needle. The thread puller 107 may have a similar soft coating (not illustrated) deposited by electro-plating process.

When the threader 100 is to be used to thread an ordinary short eye hand needle such as is shown in Figure 1, the guide 105 is swung down to inoperative position and the thread puller is simply inserted in the eye of the needle and the threader used in a well known way except that the user grasps only the threader body 101 conveniently while the work is being done.

For using the threader 100 to thread a needle in an ordinary domestic sewing machine (not shown) the upper arm 102U is disposed below the lower arm 102L with the guide element 105 in its inoperative position. The thread puller 107 is inserted in the eye of the needle and the magnetism of the body 101 serves to hold the threader more steady in its relation to the needle while a loop of thread is being placed in the notch 109, the latter then being disposed on the upper side of the thread puller.

The guide member 105 may be made from thin, stiff steel since it will engage against no polished surfaces of a needle but is adapted for engaging interiorly disposed surfaces only. The thread puller 107 may in some cases be made satisfactorily of thin cellulose strip material as shown in Figures 1 and 9 except that the notch element will be positioned as indicated in Figure 11.

Another embodiment of our invention is illustrated in Figures 14 and 15 which is designed especially for use in threading domestic sewing machines. A sewing machine needle 130 of a well known construction except as appears hereinafter may have an upwardly disposed, enlarged body or attachment element 131, a relatively long shank portion 132 and a pointed end portion 133 with a usual thread-receiving eye 134. A small ball-like integral enlargement 135 of the needle 130 is provided adjacent the lower extremity of the body 131 for a purpose presently to appear.

Through the enlargement 135 there is provided a threader guide aperture 136 which may include a lower, roundish hole element 137 to which is joined an upwardly extending narrow slot element 138, both elements preferably extending through the needle 130. The length of the slot 138 is preferably materially greater than the diameter of the hole 137 and its width materially less than the diameter of the hole. The long axis of the eye 133, the center of the hole 137 and the center line of the slot 138 are preferably in alignment and disposed in the center line of the needle 130. As will presently appear, in cases where the base or body element 131 is sufficiently long or great in diameter, the ball-shaped element 135 may be omitted.

For fitting snugly in the guide aperture 136, there is provided a needle threader guide member 139 which includes a roundish rod-like element 140 adapted for fitting snugly in the hole 137 and a relatively thin, stiff strip-like element 141 integrally joined with the rod 140 for fitting snugly in the slot element 138 along most but preferably not all of its length. The guide member 139 may be mounted in a suitable way on a body member 101 of appropriate size to replace the guide member 105. The functioning of such guide member on a needle threader 100 can be understood from a consideration of the disclosure hereinbefore regarding the needle threader 100 for threading a hand sewing needle HN. The threading of a needle 130 with the threader 100 using the guide member 139 would require the threader body 101 to be turned to dispose the arm 102L above arm 102U.

Another means by which the guide member 139 and an associated thread pulling member (not shown) may be cooperatively mounted for threading a sewing machine needle will presently appear.

In Figures 16 and 17, there are illustrated means for carrying out our invention with a domestic sewing machine needle 150 of usual construction without changing the needle in any way. A guide collar member 151 of light metal or plastic is clamped around the needle just below the usual body or attachment portion by a thumb screw 152 after an uprightly disposed positioning arm element 153 of the collar engages against the shank of a usual set or thumb screw 154 which ordinarily fastens the needle in a sewing machine clamp 155 of well known construction. The upper end of the arm 153 may be made with a V-shaped notch 156 to engage positively each side of the screw and hold the collar securely against rotative move-around the needle 150.

Extending through the collar 151, are two guide apertures 157 which may be drilled holes. For fitting snugly in the apertures two small, straight, stiff metal rods 158 are provided. These rods may be fastened rigidly to or embedded in an upper body member 160 made of metal or a suitable plastic material such as are made from cellulose. The lower end of the member may be made with a socket element 161 of a size to fit tightly around a cooperative plug element 162 integral with a lower body member 163. A thread moving or pulling unit 164 may be rigidly fastened to or embedded in the lower body member in alignment with the eye of the needle 150. This unit may include a flattened tubular member 165 in which may be detachably fastened a notched thread puller 166 by a set screw 167.

In the lower end of the lower body member 163 may be fastened a small partly protruding piece of sponge rubber 168 for engaging against a bed element MB of the sewing machine if the needle carrying means (not shown) are accidentally moved downward while the body members 160 and 163 are operatively positioned on the machine. This piece of sponge rubber can thus act as a safeguard for the small, thread puller 166.

For assembling in fixed relation, one to the other, at the factory, the upper and lower body members 160 and 163, so that a composite body of a needle threader for use with any one of several different needles of different lengths may be provided, the following means may be employed. One or more holes 169 are made in the wall around the socket 161 and small portions of solder or suitable cement, not shown, may be placed in the holes 169 in a well known way for securing the upper and lower body members together permanently.

In Figure 18 there is illustrated how a certain widely used form of needle clamping member 170 of a domestic sewing machine may be made to serve as an element of a needle threading device. Two small guide apertures 171 such as drilled holes may be made in the member 107. These holes preferably are spaced one on each side of a machine needle 172 of well known construction positioned usually at or near the center of the member 170 by a set screw which ordinarily is turned in and out by a knurled head 173. It may be desirable in some cases to turn the screw by means of a diametrical hole 174 through the head and a small rod-like member 175 such as a discarded needle inserted through the hole 174. By such arrangement, the diameter of the head 173 may be small enough that it will not interfere with the insertion of guide rods such as the rods 158 of the Figure 16 structure in the guide holes or apertures 171. A needle threading device such as that shown in Figures 16 and 17 which is mounted on the body members 160 and 163 may be employed with the needle clamp member 170.

By making the needle clamp 170 larger in diameter, a set screw having a knurled head of usual size may be employed without interfering with rods in the apertures 171.

It will be noted that the guide 139 may be mounted on the upper body member 160 and a needle threader structure of suitable size according to Figures 16 and 17 may be used for threading the needle 130.

It can be readily seen that the clamping member 170 may be lengthened at the top and constructed with a guide aperture for receiving with a close fit the guide member 139 which in such case would replace rods to go in the apertures 171, which also could be eliminated.

Certain of the advantages of our improvements will appear from a reading of the foregoing description. Other advantages arise from the provision of means for safeguarding the necessarily small thread-pulling members used in threading sewing machine needles from being bent and thereby ruined usually, since the clearance for a perfectly straight thread puller is quite small in most cases.

Other advantages arise from the provision of means for expediting the threading of sewing machine needles and needles with extra small eyes for hand sewing of certain kinds.

Other advantages arise from the provision of means for safeguarding the thread-pulling areas of eyes in needles from having the essential smooth finish of these eye areas abraded by a careless person pushing or pulling a metallic thread moving member against these areas. Other advantages arise from the employment of a needle having a portion of increased thickness in which may be made a guide aperture of a practicable size without weakening the needle objectionably.

Having described our invention, we claim:

1. For use with a sewing needle having a body pointed at one end, a thread receiving eye in said body adjacent said pointed end, and an irregular shaped cross-section guide opening in said body spaced from and in axial alignment with the thread receiving eye, a needle threader device comprising a threader body element normally disposed in initial work position substantially parallel to said needle body adjacent thereto, a stiff guiding rod member rigidly fastened to said threader body element in alignment with said guide opening and having a length at least as great as the distance between said needle and said body element's initial work position, said guide rod member having a cross-section approximately complementary to said guide opening and adapted for sliding therethrough with a snug, push fit, and a thread pulling device fastened to said threader body element and extending therefrom on the side next to said needle in alignment with said eye, said thread pulling device being spaced from said rod member a distance equal to the distance between said eye and said guide opening, said thread pulling device having a cross-section at its outer end portion materially smaller than the cross-sectional area along the length of said needle of said eye, and a length materially shorter than the length of said guiding rod member.

2. The structure described in claim 1 characterized by said thread pulling device having a notch in its side that is uppermost in operative position, said notch being spaced from said threader body a distance exceeding the distance from the final operative position of said threader body to the side of said needle farthest from said threader body.

3. The combination with a sewing machine needle having a pointed fabric piercing end portion, an enlargement of said needle adjacent its upper end, an eye, and needle threading guide means including work surfaces of aperture elements extending through said needle enlargement transversely to the long axis of said needle; of a needle threader device including a body member normally disposed in initial work position alongside said needle, a thread pulling member fastened to and extending from said body toward said eye and having a thin element adapted for passing through said eye, stiff, guide means fastened to said body and extending toward said aperture elements a greater distance than said thread pulling member extends toward said eye, said stiff guide means having work surfaces approximately complementary in cross-section to said aperture elements, said stiff guide means being spaced from said thread pulling member a distance equal to the distance between said aperture elements and said eye and positioned relative to said thread pulling member as to cause the latter to be passed through said eye as said guide means are passed through said aperture elements.

4. The structure described in claim 3 modified by said needle threading guide means including a guide aperture round in part, at least, extending through said enlargement centrally disposed therein parallel to the work path through said eye, and two guide elements on said needle disposed in parallel planes, one guide element on each side of the axis of said aperture; said structure being modified further by said stiff guide means on said body having work surfaces in approximately complementary relation to said guide elements on said needle.

RUFUS BIBB LILLARD.
WILLIAM W. LILLARD.

References Cited in the file of this patent

UNITED STATES PATENTS

| Number | Name | Date |
|---|---|---|
| 524,896 | Goldman | Aug. 21, 1894 |
| 735,211 | Coffey | Aug. 4, 1903 |
| 1,260,611 | Welling | Mar. 26, 1918 |
| 2,167,080 | Mason | July 25, 1939 |

FOREIGN PATENTS

| Number | Country | Date |
|---|---|---|
| 377,459 | Great Britain | July 28, 1932 |